United States Patent [19] [11] 4,065,606
Casson [45] Dec. 27, 1977

[54] ELECTRIC RESERVE BATTERIES

[75] Inventor: William Ernest Casson, Emsworth, England

[73] Assignee: The McMurdo Instrument Company Limited, Croydon, England

[21] Appl. No.: 691,991

[22] Filed: June 2, 1976

[30] Foreign Application Priority Data

June 10, 1975 United Kingdom ............... 24884/75

[51] Int. Cl.² ........................................... H01M 6/04
[52] U.S. Cl. .................................... 429/198; 429/114; 429/200
[58] Field of Search ................ 429/114, 198, 199, 200

[56] References Cited

U.S. PATENT DOCUMENTS 3,150,009 9/1964 Pattin ................................ 429/114
3,798,069 3/1974 Broadhead ........................ 429/198

FOREIGN PATENT DOCUMENTS 356,950 8/1905 France ................................ 429/198

Primary Examiner—Donald L. Walton
Attorney, Agent, or Firm—Hane, Roberts, Spiecens & Cohen

[57] ABSTRACT

In a reserve battery comprising a plurality of cells, each of which contains plates of different materials immersed in an electrolyte, wherein uniform filling of the cells with electrolyte is ensured by equalizing apertures formed in the partitions between adjacent cells, the electrolyte contains about 0.05 to 5.0 percent by weight of an organic levelling agent as used in electro-plating whereby the rate of growth of filamentary accretions extending from the electrodes is reduced.

4 Claims, 2 Drawing Figures

ELECTRIC RESERVE BATTERIES

BACKGROUND OF THE INVENTION

1. Field of the Invention

This invention relates to improvements in electric reserve batteries consisting of solid electrodes, formed for example of lead and lead dioxide, and immersed when in operation in an electrolyte producing soluble reaction products at the electrodes.

As distinct from the conventional lead-acid secondary battery in which porous electrodes are immersed in a sulphuric acid electrolyte, the electrodes of the batteries to which the present invention relates are of a dense, nonporous form, being made, for example, by electro-deposition or by casting. The electrolyte employed is preferably perchloric acid or fluoboric acid, though fluorsilicic or nitric acid may in some cases be employed.

Such a battery employing lead, lead dioxide and fluoboric acid yields an electrical potential of about 1.5 volts and many applications of such cells require that higher potentials be obtained by connecting a plurality of such cells in series.

2. Description of the Prior Art

A convenient known method of providing a battery consisting of cells of the type above described is to coat a metal, usually lead on one side of a thin, electrically conductive substrate and an oxide of the metal, usually lead dioxide, on the other. Plates made of such composite material may then be used as both electrodes and cell walls, their edges being sealed together by insulating material to form the electrolyte spaces. The end electrodes of such a battery need include respectively only the metal and the metal oxide coatings.

Batteries of the construction above described are often used as reserve batteries, the electrolyte being introduced between the plates of each cell only when the battery is required for use. It is usual to fill all the cells at the same time to avoid the production of intercell short circuits. In so doing it is difficult to avoid both over-filling and under-filling of the cells. In many applications of reserve batteries space is at a premium and this fact prohibits the use of many known exact methods of filling.

Some batteries intended for applications in which they are rotated while in use are formed with flat, parallel bi-polar plates disposed in planes perpendicular to the axis of rotation. Equalisation of the quantity of electrolyte in the cells of a battery has then been affected by providing small holes through the intermediate, bi-polar electrodes separating adjacent cells of the battery. This simplifies the filing of the cells but introduces some difficulties.

SUMMARY OF THE INVENTION

It is an object of the invention to provide an improved electrolyte for a reserve battery that will reduce the rate of growth of accretions on the electrodes of a battery in which the electrolyte is used.

It is a further object of the invention to provide a reserve battery electrolyte containing an accretion-suppressant additive.

It is an additional object of the invention to provide a reserve battery that will provide enhanced working life for the same dimensions as known batteries.

It is an alternative object of the invention to provide a reserve battery that will provide an enhanced rate of discharge as compared with a battery of like size and of known construction.

It is a specific object of the invention to provide a reserve battery in which uniform filling of the battery cells with electrolyte is assisted by the presence of liquid-level equalizing apertures in the partitions between adjacent cells and in which the electrolyte used is such as to reduce the rate of growth of accretion from electrode surfaces adjacent the equalizing apertures.

An embodiment of the invention comprises a reserve battery comprising a plurality of cells, each of which is defined by a portion of an insulating casing and by opposed surfaces of two electrode plates, and means for introducing a liquid electrolyte into all of said cells from a common source, wherein an aperture is provided in each one of said electrode plates separating two of said cells to permit equalisation of the level of said electrolyte within said cells during operation of the battery, wherein there is added to the electrolyte a minor amount of a material of a kind known for use as a levelling agent in electroplating solutions for the purpose of improving the quality of electroplated deposits. Such levelling agents are exemplified by gelatine and animal glue, but many other materials have been used as levelling agents in plating and may prove advantageous in carrying out the present invention. Among such levelling agents may be mentioned: peptone, phenol, hydroquinone, 1,4 naphthoquinone, 1-naphthol-4-hydroxy anthroquinone, 1-amino-1-naphthol-3-sulphonic acid, eugenol, lignin-sulphonic acids, dimethyl aniline, dibenzene sulphonamide, allantoin, resorcinal, coumarin, 1,4 naphthol sulphonic acid, urea, glycine, and many derivatives of these materials.

It is found that the presence of such levelling agents substantially reduces the rate of growth of filamentary deposits from the battery plates. It is also found that a substantial increase in battery discharge time is obtained and that a substantial reduction results in the fluctuations of instantaneous battery voltage often observed hitherto.

Alternatively, if the whole or some part of the possible increase in discharge time is unnecessary, the equalizing apertures may be made of larger size, thus permitting the use of more robust tools for producing the apertures and decreasing the equalization time.

Figure 1:
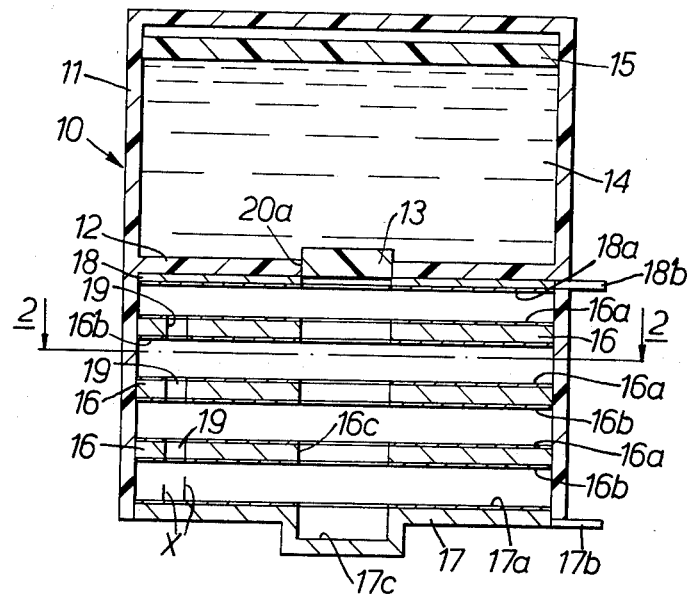
FIG. 1 is a cross sectional elevation of one embodiment of a reserve battery embodying the invention.
Figure 2:
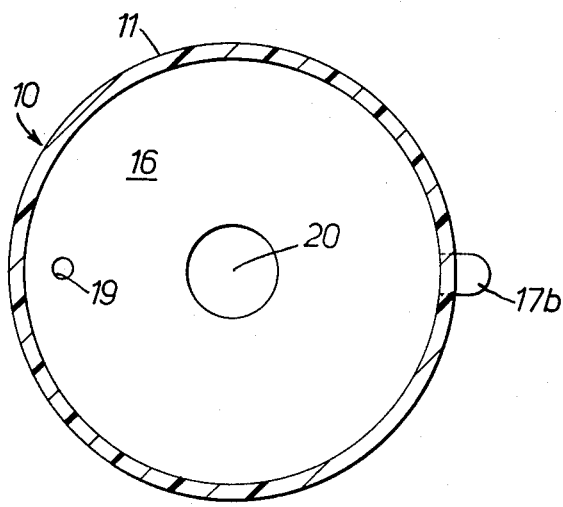
FIG. 2 is a sectional plan view of the battery shown in FIG. 1, taken along the line 2—2 therein.

The battery 10 shown in FIGS. 1 and 2 comprises a cylindrical casing 11 of insulating material divided into approximately equal portions by a transverse partition 12 having centrally therein an aperture 12a which in the quiescent condition of the battery is closed by a tightfitting plug 13. The space above partition 12 contains a quantity of electrolyte 14, above which is arranged a plunger 15. When the battery is to be taken into use, plunger 15 is driven downwards by suitable means; in one embodiment by upward acceleration of the battery as a whole so that inertial forces acting on the plunger 15 drive it downwards relative to the casing 11. When plunger 15 is moved downwards plug 13 is displaced from its position in aperture 12s of partition 12 and electrolyte 14 flows through aperture 12a into the battery proper.

The battery proper comprises a plurality of electrodes extending transversely across the lower portion of casing 11, below partition 12, and comprising specifically a plurality of intermediate electrode plates 16. Each of the intermediate electrode plates 16 consists of a thin sheet of conductive material coated on one side, the upper side as shown in the drawing, with a layer 16a of a metal, usually lead, and on the other side, the lower side as shown in the drawing, with a layer 16b of a non-metal, usually lead dioxide. Each plate 16 has a central aperture 16c permitting the passage of plug 13. The lowermost electrode plate 17, which constitutes one end of the battery, is coated on its upper surface with a layer 17a of lead. Plate 17 is provided with a central well 17c into which plug 13 may descend, thus allowing electrolyte to pass into all the cells. The uppermost electrode plate 18, which is applied against partition 12, is coated on its lower surface with a layer 18a of the preferred non-metal, in this case lead dioxide.

Lowermost plate 17 conveniently has a terminal extension 17b extending radially outwardly from its periphery, though other means of establishing electrical contact with the plate may be employed as desired. Similarly, uppermost plate 18 is provided with a terminal extension 18b, while again other means for establishing electrical contact with this plate may be employed. Each of intermediate electrode plates 16 is pierced by a small hole 19 to permit equlisation of the electrolyte levels in the cells when the battery is filled. In operation the battery will be rotated about its axis of symmetry 20 so that a substantial pseudo-gravitational force will be available to produce movement of the electrolyte through relatively small holes.

A difficulty which arises in the application of such batteries is that extensions X in the form of metal filaments tend to grow from the lead-coated negative surface of the electrode plate in the area opposed to the equalisation hole towards the adjacent positive electrode plate. When such a filament reaches the positive plate, contact between the filament and the plate causes fluctuations in cell voltage and early failure of the cell. Although this difficulty is largely overcome by aligning the equalising apertures, short-circuiting of the end cells in which a lead surface is disposed opposite to the equalising aperture is a continuing cause of difficulty.

In accordance with the present invention this difficulty is wholly overcome or greatly reduced by adding to the electrolyte 14 a minor amount (quantities of the order of 0.02 to 5.0 weight percent are contemplated and quantities in in the range of 0.1 to 1.0 weight percent are preferred) of a levelling agent such as is used is electroplating the battery metal. A material useful for this purpose is an organic colloid such as commercial grade gelatine as marketed for use as an additive to electroplating solutions by Conning & Co., Birmingham, England. Other organic colloid materials of like nature, such as animal glue, may also be employed, as may other known levelling agents useful in plating the metal of the electrodes. When this metal is lead, further levelling agents known to be useful are: peptone, phenol, hydroquinone, 1,4 naphthoquinone, 1-naphthol-4-hydroxy anthroquinone, 1-amino-1-naphthol-3-sulphonic acid, eugenol, lignin-sulphuric acids, dimethyl aniline, dibenzene sulphonamide, allantoin, resorcinol, coumarin, 1,4 naphthol sulphonic acid, urea, glycine and many derivations of these.

When metals other than lead are involved in the reserve battery, appropriate levelling agents known for electroplating those metals will be used.

It will be understood that the invention is not limited to electrolytes for use in reserve batteries, since advantages can likewise be obtained in using accretion-suppressant additives of the invention in other batteries.

What is claimed is:

1. As a reserve battery electrolyte, an electrolyte solution selected from the group consisting of perchloric acid, fluoboric acid, fluorsilicic acid and nitric acid, said solution having added thereto as an accretion growth inhibitor, from 0.05 to 5.0 weight percent of a levelling agent selected from the group consisting of gelatine, peptone, phenol, hydroquinone, 1,4 naphthoquinone, 1-naphthol-4-hydroxy anthroquinone, 1-amino-1-naphthol-3-sulphonic acid, eugenol, lignin-sulphuric acids, dimethyl aniline, dibenzene sulphonamide, allantoin, resorcinal, coumarin, 1,4 naphthol sulphonic acid, urea and glycine.

2. The invention claimed in claim 1 wherein said levelling agent is present in the range of 0.1 to 1.0 weight percent.

3. A lead/lead oxide reserve battery comprising an electrolyte selected from the group consisting of perchloric acid, fluoboric acid, fluorsilicic acid and nitric acid, said solution having added thereto as an accretion growth inhibitor from 0.05 to 5.0 percent of a levelling agent selected from the group consisting of gelatine, peptone, phenol, hydroquinone, 1,4 naphthoquinone, 1-naphthol-4-hydroxy anthroquinone, 1-amino-1-naphthol-3-sulphonic acid, eugenol, lignin-sulphuric acids, dimethyl aniline, dibenzene sulphonamide, allantoin, resorcinal, coumarin, 1,4 naphthol sulphonic acid, urea and glycine.

4. The invention claimed in claim 3 wherein said additive is present in the range from 0.1 to 1.0 weight percent.

* * * * *